(12) United States Patent
Cook et al.

(10) Patent No.: US 9,623,903 B2
(45) Date of Patent: Apr. 18, 2017

(54) STEERING SYSTEM AND UTILITY VEHICLE INCORPORATING SAME

(71) Applicant: Exmark Manufacturing Company, Incorporated, Beatrice, NE (US)

(72) Inventors: David Michael Cook, LaGrange, KY (US); Garry W. Busboom, Beatrice, NE (US); Clark S. Papke, Cortland, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 0 days.

(21) Appl. No.: 14/697,909

(22) Filed: Apr. 28, 2015

(65) Prior Publication Data

US 2016/0318549 A1    Nov. 3, 2016

(51) Int. Cl.
| | | |
|---|---|---|
| *B62D 7/08* | (2006.01) | |
| *B62D 7/20* | (2006.01) | |
| *B62D 1/12* | (2006.01) | |
| *B62D 5/04* | (2006.01) | |
| *B62D 3/02* | (2006.01) | |

(52) U.S. Cl.
CPC ............. *B62D 7/08* (2013.01); *B62D 1/12* (2013.01); *B62D 3/02* (2013.01); *B62D 5/04* (2013.01); *B62D 7/20* (2013.01)

(58) Field of Classification Search
CPC ... B62D 7/08; B62D 5/00; B62D 7/16; B62D 7/18; B62D 7/20; B62D 51/02
USPC .................................................. 280/93.502
See application file for complete search history.

(56) References Cited

U.S. PATENT DOCUMENTS

| | | | |
|---|---|---|---|
| 3,168,156 A | | 2/1965 | Ulinski |
| 3,587,767 A | * | 6/1971 | Gamaunt ............... B62D 5/093 |
| | | | 180/431 |
| 3,819,120 A | | 6/1974 | Walker |
| 4,487,370 A | | 12/1984 | Speicher |
| 4,548,362 A | | 10/1985 | Doering |
| D282,931 S | | 3/1986 | Doering et al. |
| 4,624,195 A | | 11/1986 | Doering |
| 4,867,381 A | | 9/1989 | Speicher |
| 5,333,795 A | | 8/1994 | Jessen |
| 5,361,988 A | | 11/1994 | Nelson |
| 5,657,828 A | | 8/1997 | Nagamachi |

(Continued)

OTHER PUBLICATIONS

"100 lb ATV Spreader" Info Sheet [online]. Buyers Products Co. Archive dated Mar. 12, 2014 [retrieved Sep. 8, 2015]. Retrieved from the Internet: <URL: https://web.archive.org/20140312225058/ http://www.buyersproducts.com/Spreaders/ATV-Spreaders/100-lb-ATV-Spreader/14; 1 page.

(Continued)

*Primary Examiner* — Faye M Fleming
(74) *Attorney, Agent, or Firm* — Mueting, Raasch & Gebhardt, P.A.

(57) ABSTRACT

A grounds maintenance vehicle such as a stand-on spreader/ sprayer and a steering system for use with the same. In one embodiment, the steering system includes a laterally swinging control handle accessible by an operator standing on a platform of the vehicle. The handle controls movement of one or more steerable wheels such that lateral swinging of the control handle toward a left side results in a corresponding left turn, while lateral swinging of the control handle toward a right side results in a corresponding right turn.

25 Claims, 9 Drawing Sheets

(56) References Cited

U.S. PATENT DOCUMENTS

| | | | |
|---|---|---|---|
| 6,135,036 | A | 10/2000 | Speicher, III et al. |
| 6,336,600 | B1 | 1/2002 | Jessen |
| 6,845,829 | B2 | 1/2005 | Hafendorfer |
| 6,932,287 | B2 | 8/2005 | Kost et al. |
| 7,063,280 | B1 | 6/2006 | Bogart et al. |
| 7,740,099 | B2 | 6/2010 | Field et al. |
| 7,841,044 | B1 | 11/2010 | Weihl et al. |
| 7,918,305 | B2 | 4/2011 | Scherbring et al. |
| 7,954,573 | B2 | 6/2011 | Jessen |
| 8,056,828 | B1 | 11/2011 | Kline et al. |
| 8,074,904 | B1 | 12/2011 | Hobbs |
| D662,522 | S | 6/2012 | Simpson |
| D673,586 | S | 1/2013 | Truan et al. |
| 8,474,735 | B2 | 7/2013 | Hobbs, Jr. et al. |
| 8,632,018 | B2 | 1/2014 | Kline et al. |
| 2003/0188906 | A1 | 10/2003 | Bank |
| 2004/0262052 | A1 | 12/2004 | Jessen |
| 2006/0054370 | A1 | 3/2006 | Sugioka et al. |
| 2006/0070747 | A1 | 4/2006 | Isaman et al. |
| 2006/0278446 | A1* | 12/2006 | Oxley .................. B60W 30/02 180/6.24 |
| 2007/0284839 | A1* | 12/2007 | Sasaoka .................. B62D 3/02 280/93.502 |
| 2009/0078485 | A1 | 3/2009 | Gutsch et al. |
| 2010/0250040 | A1 | 9/2010 | Yamano |
| 2011/0278088 | A1 | 11/2011 | Weihl et al. |
| 2012/0298767 | A1 | 11/2012 | Kline et al. |
| 2014/0131465 | A1 | 5/2014 | Kline et al. |
| 2014/0298767 | A1* | 10/2014 | Piontek ................ A01D 34/006 56/14.7 |

OTHER PUBLICATIONS

"Installation Instructions: ATVS100 ATV Spreader" [online]. Buyers Products Co., Date Unknown [retrieved on Sep. 8, 2015]. Retrieved from the Internet: <URL: http://www.buyersproducts.com/Common/Documents/3011654_C.pdf>, 4 pages.

"Cub Cadet Commercial Offers 3-in-1 Stand-on Spreader/Sprayer: Application Landscapers Get Productivity Boost with Granular, Liquid, and Spot-Spray Capability in One Machine" [online]. Oct. 23, 2008 [retrieved on Jun. 23, 2015]. Retrieved from the Internet: <URL: http://newsroom.cubcadet.com/newsroom/article/new-articlepage-17#images; 2 pages.

"Cub Cadet Commercial, Hydrostatic Stand-On Self-Propelled Spreader-Sprayer: Operator's Manual;" Form #769-04150 Rev. 09-0, Cub Cadet LLC, Cleveland, Ohio, Nov. 12, 2008; 20 pages.

"EarthWay EV-N-Spred, Operation and Assembly Manual for the M30 12-volt ATV Broadcast Spreader." Form Sep. 2014 Part #52195. EarthWay Products, Inc., Bristol, Indiana. Sep. 2014, 6 pages.

U.S. Appl. No. 14/875,861, filed Oct. 6, 2015, Papke et al.
U.S. Appl. No. 14/698,061, filed Apr. 28, 2015, Papke.
U.S. Appl. No. 29/525,222, filed Apr. 28, 2015, Nicholson et al.

"Ground Logic—Go for a Joyride," web page [online]. Ground Logic, Inc. Archive dated May 17, 2014, copyright 2011 [retrieved on Jun. 23, 2015]. Retrieved from the Internet: <URL: https://web.archive.org/web/20140517085448/http://groundlogicinc.com/; 1 page.

"2015 Ground Logic—Premium Commercial Spreading & Spraying Equipment," Sales Brochure. Ground Logic Inc., Lincoln, Nebraska, 4 pages.

"L.T. Rich Products, Inc.—Owners Manual—JR36R / ZS-3620R Z-Spray," Owners Manual. Available at least as early as Jul. 1, 2015. L.T. Rich Products, Inc., Lebanon, Indiana, 27 pages.

"Commercial Sprayers, Seeders, & Aerators—Indiana-Z-Spray," web page [online]. L.T. Rich Products, Inc. Copyright 2015 [retrieved on Jun. 23, 2015]. Retrieved from the Internet: <URL: www.z-spray.com/z-spray-sprayers/>; 3 pages.

"L.T. Rich Products: JR-36R," web page [online]. Jan. 15, 2013 [retrieved on Jun. 23, 2015]. Retrieved from the Internet: <URL: http://landscapemanagement.net/l-t-rich-products-jr-36r>; 2 pages.

"PermaGreen Triumph Spreader Sprayer Operator's Manual." Operator's Manual, North American Version (v12). Perma-Green Supreme, Inc. Feb. 9, 2010; 45 pages.

"PermaGreen Triumph Spreader Sprayer Operator's Manual: Model C1C with Serial No. 14151 and above." Operator's Manual, North American Version (v15). Perma-Green Supreme, Inc. Nov. 9, 2014; 44 pages.

"PermaGreen: It's Your Future," Sales Brochure. Perma-Green Supreme, Inc. Copyright 2014; 12 pages.

"R57200 Spread-N-Spray: TurfEx's RS7200 Spread-N-Spray isn't just a spreader/sprayer combination . . . It's the most efficient way to care for turf," Brochure. Trynex International. Copyright 2012; 2 pages.

"RS7200E Spread-N-Spray: The New RS7200E Spread-N-Spray," Brochure. Trynex International. Copyright 2013; 2 pages.

\* cited by examiner

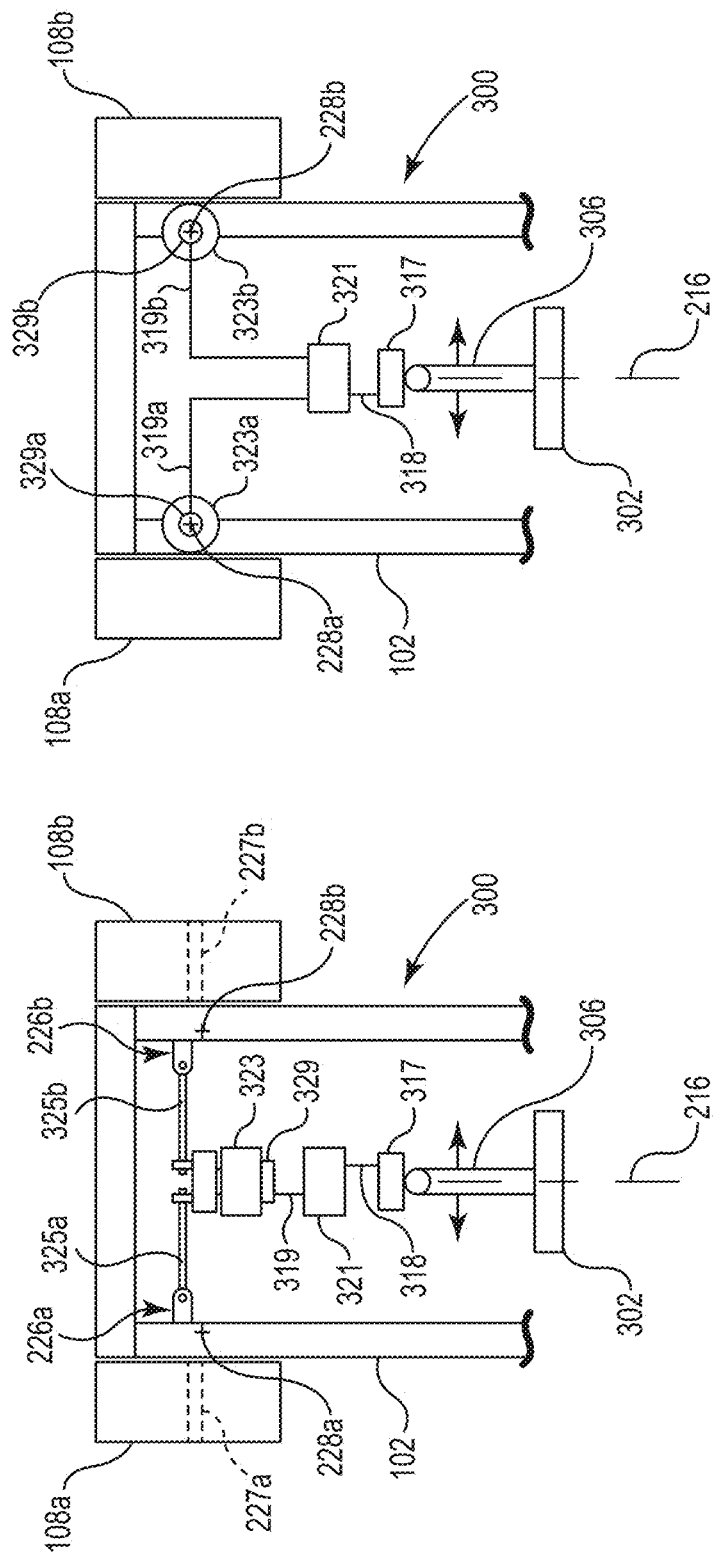

STEERING SYSTEM AND UTILITY VEHICLE INCORPORATING SAME

Embodiments described are directed generally to ride-on or walk-behind utility vehicles such as, for example, ride-on turf care vehicles and, more specifically, to steering systems for use with such vehicles.

BACKGROUND

Utility vehicles including (but not limited to) grounds maintenance vehicles such as ride-on and walk-behind lawn mowers, material spreaders, and the like are known. These vehicles typically include various controls accessible by the operator during use.

Among the typical controls are a steering system for directing vehicle travel. For example, steering of the vehicle may often be achieved via a conventional steering wheel, by a handlebar-type device, or by a lever or "stick" control system.

While effective, such steering systems may present drawbacks under certain scenarios. For example, in the case of some steering wheel configurations, the operator might keep one hand on the steering wheel and the other hand on a transmission or speed control. Actuation of other vehicle controls may, therefore, require temporarily moving one hand to another control input.

Alternatively, vehicles having individually and differentially driven drive wheels independently controlled by corresponding left and right drive control levers may allow the operator to control both speed and turning via manipulation of the two control levers. However, the operator may still need to temporarily move a hand from one of the control levers in order to manipulate other control inputs. This need to temporarily relocate a hand from the steering controls to another control input may also be present with handlebar-type steering systems.

SUMMARY

Embodiments described herein may provide a utility vehicle including: a chassis having a front end and a rear end; and at least one front wheel rotatably coupled to the front end of the chassis. The front wheel is adapted to rotate about an axle attached to a steering knuckle, and the steering knuckle is adapted to pivot, relative to the chassis, about a steer axis. The vehicle also includes a steering system having a control member. The control member includes a first end defining an operator control handle, and a second end pivotally connected to the chassis such that the control member is pivotable, relative to the chassis, about a pivot axis. The steering system further includes: a lever arm connected to the control member at or near the second end, the lever arm having a distal end spaced-apart from the pivot axis; and a connecting element attached to the distal end of the lever arm and to the steering knuckle. The steering system proportionally converts lateral movement of the control handle to pivoting of the front wheel about the steer axis.

In another embodiment, a utility vehicle is provided that includes a chassis having a front end, a rear end, and a longitudinal axis extending between the front and rear ends. At least one front wheel is rotatably coupled to the front end of the chassis, wherein the front wheel is adapted to rotate about an axle attached to a steering knuckle. The steering knuckle is adapted to pivot, relative to the chassis, about a steer axis. The vehicle further includes a steering system having: a pivot shaft pivotally coupled to the chassis such that the pivot shaft pivots about a pivot axis that is parallel to the longitudinal axis; and a control arm having a first end defining an operator control handle, and a second end connected to the pivot shaft. A lever arm is provided and also connected to the pivot shaft, wherein the lever arm includes a distal end spaced-apart from the pivot axis. The steering system also includes a connecting rod attached to the distal end of the lever arm and to the steering knuckle. The steering system proportionally converts lateral movement of the control handle to pivoting of the front wheel about the steer axis.

In yet another embodiment, a utility vehicle is provided that includes a chassis having a front end and a rear end, wherein a longitudinal axis extends along the chassis between the front and rear ends. A prime mover is supported by the chassis, and at least one rear wheel is rotatably coupled to the chassis at or near the rear end, the rear wheel being powered by the prime mover to propel the vehicle over a ground surface. Left and right front wheels are provided and rotatably coupled to the chassis at or near the front end. The left front wheel is adapted to rotate about a left axle, wherein the left axle is attached to a left steering knuckle that is itself coupled to the chassis at, and pivotable about, a left wheel steer axis. Similarly, the right front wheel is adapted to rotate about a right axle, wherein the right axle is attached to a right steering knuckle that is itself coupled to the chassis at, and pivotable about, a right wheel steer axis. The vehicle further includes: a platform attached to the chassis and adapted to support an operator; and a steering system. The steering system includes: a pivot shaft attached to the chassis and operable to pivot about a pivot axis parallel to the longitudinal axis; a control arm having a second end attached to the pivot shaft, the control arm extending upwardly and rearwardly to terminate at a first end; and a lever arm attached to the pivot shaft. A left tie rod is connected between the lever arm and the left steering knuckle, and a right tie rod is connected between the lever arm and the right steering knuckle. A control handle is attached to the first end of the control arm, wherein lateral movement of the control handle results in proportional pivoting of the left and right front wheels about the left and right steer axes, respectively.

In yet another embodiment, a utility vehicle is provided that includes: a chassis comprising a front end and a rear end; and a front wheel rotatably coupled to the front end of the chassis. The front wheel is adapted to rotate about an axle attached to a steering knuckle, and the steering knuckle is adapted to pivot, relative to the chassis, about a steer axis. A steering system is also provided and includes a control member having a first end defining an operator control handle, and a second end pivotally connected to the chassis such that the control member is pivotable, relative to the chassis, about a pivot axis. A position sensor is adapted to detect a position of the control member and produce a position signal, and an electronic controller is adapted to receive the position signal and calculate a steering angle command signal. An actuator is operatively connected to the steering knuckle and is adapted to receive the steering angle command signal and pivot the front wheel about the steer axis in response to the steering angle command signal.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIGS. 9A-9B are diagrammatic views of a vehicle incorporating a steering system in accordance with another embodiment of the disclosure, wherein: FIG. 9A illustrates a drive-by-wire system using a single steering motor; and FIG. 9B illustrates another drive-by-wire system utilizing two steering motors.

Figure 1:
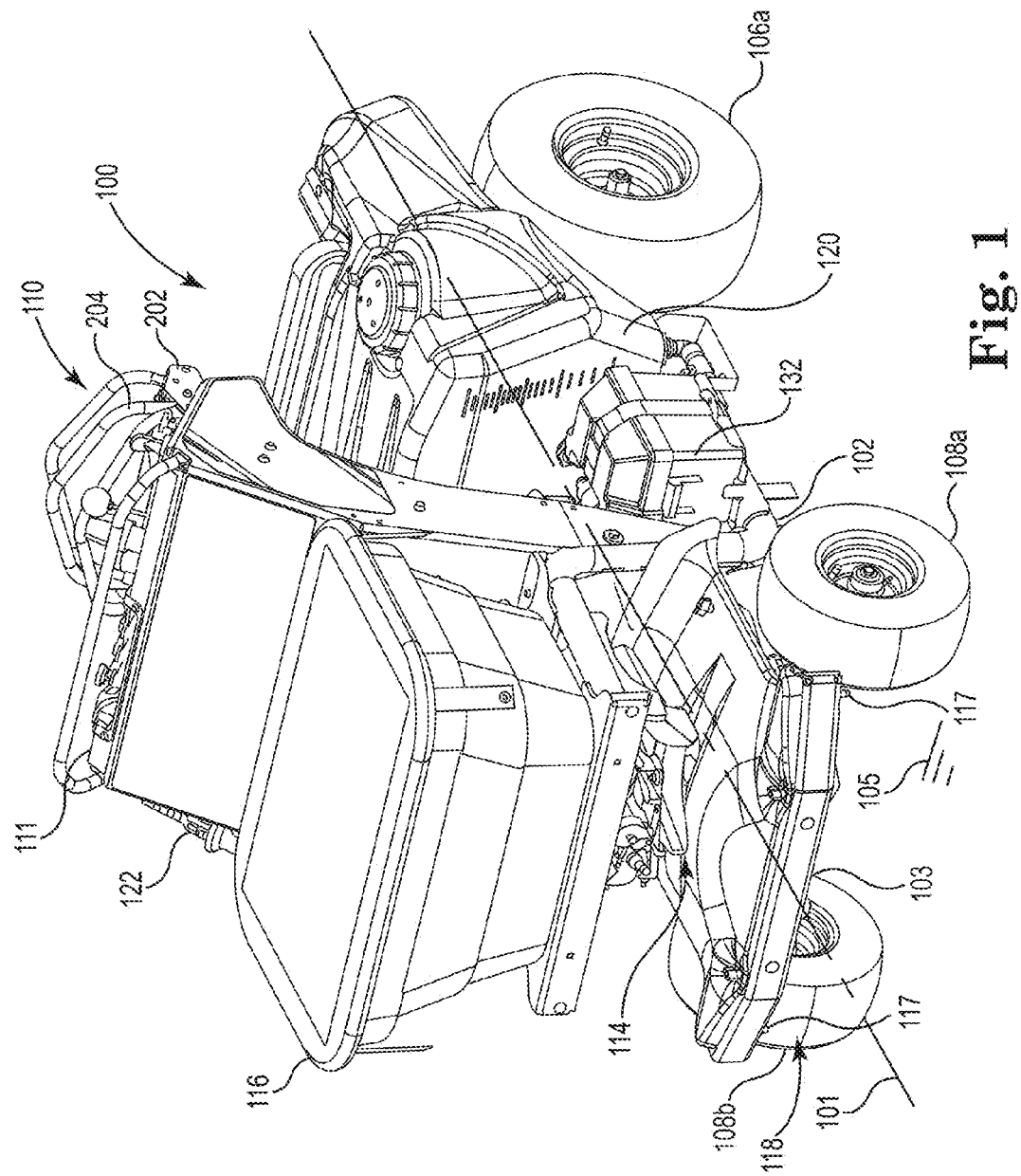
FIG. 1 is a front perspective view of a utility vehicle (e.g., a stand-on material spreader/sprayer) incorporating a steering system in accordance with one embodiment of the disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary for an understanding of the various exemplary embodiments described herein. The lack of illustration/description of such structure/components in a particular figure is, however, not to be interpreted as limiting the scope of the various embodiments in any way. Moreover, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated, are also contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Generally speaking, embodiments of the present disclosure are directed to a utility vehicle that includes a steering system actuated by a laterally (side-to-side) swinging motion of an operator control handle. In one embodiment, the vehicle may include an operator support platform adapted to support a riding (e.g., standing) operator. Within reach of the standing operator is the operator control handle. The control handle may be connected to a control member pivotally attached to structure (e.g., to a chassis) of the vehicle. In one embodiment, the control member is adapted to pivot about an axis parallel to a longitudinal (e.g., travel) axis of the vehicle. To execute a turn, the operator may "swing" the control handle, e.g., move it through a lateral, side-to-side arc. Via connection to one or more steerable wheels of the vehicle, such movement of the control handle may cause the steerable wheel(s) to pivot about a steer axis, effecting a vehicle turn. The control member may, in some embodiments, also include propulsion controls adapted to control speed and direction of the vehicle.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the vehicle 100 while the vehicle is in an operating configuration, e.g., while the vehicle is positioned such that wheels 106 and 108 rest upon a generally horizontal ground surface 105 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are generally identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Figure 2:
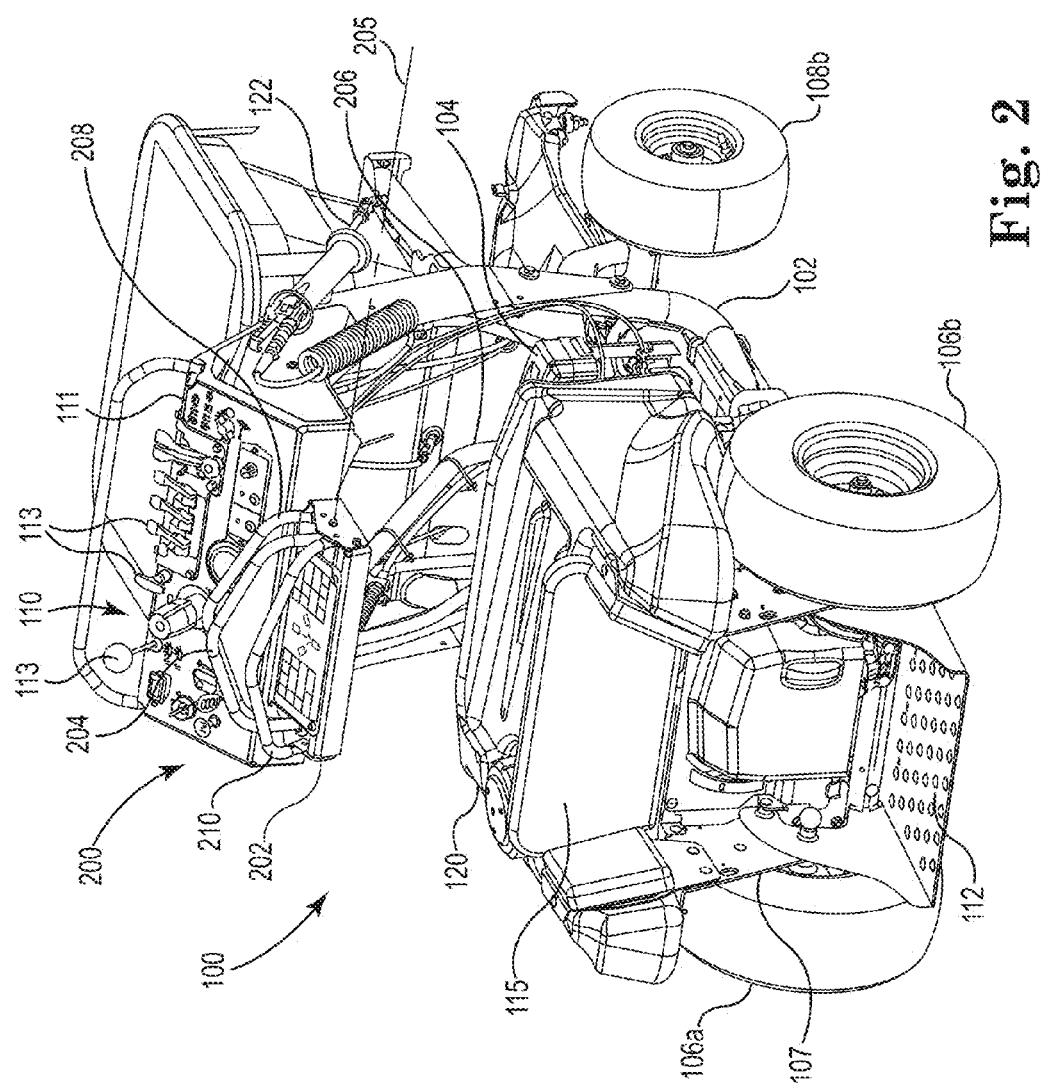
FIG. 2 is a rear perspective view of the spreader/sprayer of FIG. 1 illustrating an operator platform and control area in accordance with one embodiment.

With reference to the figures of the drawing, wherein like reference numerals designate like parts and assemblies throughout the several views, FIGS. 1 and 2 illustrate an exemplary utility vehicle (e.g., powered grounds maintenance vehicle) incorporating a steering system in accordance with embodiments of the disclosure. The steering system may allow a riding or walk-behind operator to control the direction of travel (i.e., heading) of the vehicle by pivoting each of the steerable wheels about its respective steer axis.

As stated above, the exemplary vehicle may incorporate a material application apparatus. In one embodiment, the material application apparatus includes one or both of a granular material (e.g., turf fertilizer, seed, ice control materials, etc.) broadcast spreader and a liquid (e.g., fertilizer, ice control materials, etc.) sprayer ("spreader/sprayer"). While the material application apparatus could be removably attached to a general purpose utility vehicle, the vehicle illustrated in the figures is a dedicated spreader/sprayer, also referred to herein merely as "vehicle 100."

As used herein, "utility vehicle" may include most any general purpose or dedicated use compact working vehicle. In the illustrated embodiments, the utility vehicle is configured as a powered, ride-on grounds maintenance vehicle (e.g., a self-propelled vehicle adapted to provide a maintenance function to a ground (e.g., a turf, garden, or paved) surface. While shown and described herein as a spreader/sprayer vehicle, such a configuration is not limiting. Rather, other grounds working/turf care vehicles including lawn mowers, skid-steer vehicles, aerators, dethatchers, snow throwers, debris management systems, pavement cleaners, and turf and/or pavement painters, to name a few, may incorporate steering systems like those described herein. In addition, steering systems like embodiments described herein may find applicability to other types of ride-on (e.g., sit-on or stand-on) and walk-behind vehicles. For example, steering systems like the embodiments described herein may find application in both general purpose and dedicated use utility vehicles such as small tugs and personal mobility vehicles.

While the general construction of the vehicle 100 is not necessarily central to an understanding of exemplary embodiments of the steering system, an illustrative spreader/sprayer is briefly described below.

The vehicle 100 may include a frame or chassis 102, wherein the vehicle/chassis may define front and rear ends 103 and 107, respectively, with a longitudinal or travel axis 101 passing through the vehicle from the front end to the rear end (i.e., a longitudinal axis is an axis of vehicle travel when the vehicle is traveling in a straight line). As used herein, a transverse axis or plane refers to an axis or plane that is normal to the longitudinal axis 101.

The exemplary chassis 102 supports a prime mover (e.g., internal combustion engine 104), which may, in one embodiment, be located at or near a central portion of the chassis 102 as shown in FIG. 2. One or more, e.g., left and right ground-engaging drive members (e.g., rear drive wheels 106a, 106b (see FIG. 2)) may be coupled for rotation, relative to left and right sides, respectively, of the chassis 102 at or near the read end 107. One or both drive wheel 106 may be powered to rotate, relative to the chassis 102, about a fixed axis such that the one or both drive wheels may propel the vehicle 100 over the ground surface 105. In one embodiment, the vehicle 100 may be configured with a hydrostatic transmission 124 (see, e.g., FIGS. 4 and 5) having an open differential operable to effectively drive either or both of the rear drive wheels 106 in a manner similar to a conventional rear-wheel drive automobile. Of course, other types of transmissions (e.g., limited slip differential, independently-driven wheels, etc.) are possible without departing from the scope of the disclosure.

While described herein as an internal combustion engine 104, other embodiments could utilize other prime movers (e.g., an electrical power source) to power the drive wheels 106. Moreover, while illustrated as wheels 106, other embodiments may utilize other drive members (e.g., tracks or the like) without departing from the scope of this disclosure.

The vehicle 100 may additionally include at least one, e.g., two, steerable support members (e.g., wheels 108a, 108b) rotatably coupled to the front end of the chassis 102 (in the illustrated embodiment, the support wheels 108 are located forward of the drive wheels 106 (e.g., during normal forward motion of the vehicle) and are thus referred to herein as "front" wheels). Accordingly, the rear drive wheels 106 may support a rear portion of the vehicle 100 in rolling engagement with the ground surface 105, while the front wheel(s) 108 may likewise support a front portion of the vehicle. Once again, while described herein as utilizing two rear drive wheels and two front wheels, such a configuration is merely exemplary. For example, other embodiments may use more or less wheels (e.g., a tri-wheel configuration), while still other embodiments may provide different drive wheel configurations altogether (e.g., front-wheel drive or all-wheel drive).

The vehicle 100 may, as shown in FIG. 2, also include a control station 110 having one or more vehicle controls located thereon. In some embodiments, the control station 110 may include both a movable (e.g., lateral or side-to-side swinging) operator control handle 202 (which forms part of the exemplary steering system 200), as well as a fixed or stationary control area 111. The operator control handle 202 may be formed at or near a first or upper end of a control member 206 that, as further described herein, is pivotally coupled to the chassis 102. The control station 110 may be conveniently accessible by an operator located upon an operator station (e.g., standing upon a platform 112 attached to the chassis 102, see FIG. 2). While shown as being swingable in a side-to-side manner, other embodiments may permit pivoting of the control handle 202 in other directions (e.g., about a vertical axis).

Figure 3:
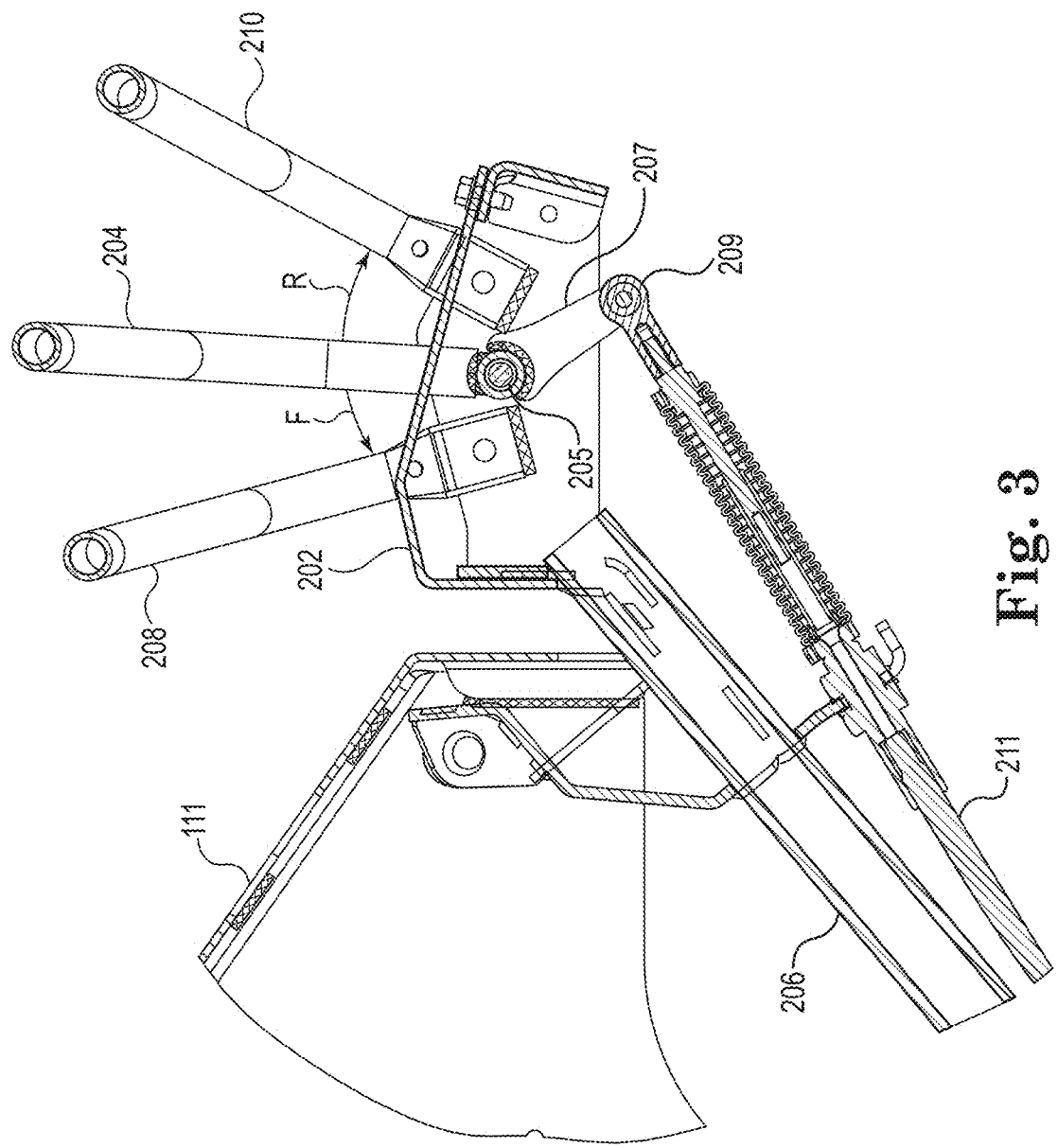
FIG. 3 is an enlarged section view of an operator control handle of the spreader/sprayer of FIGS. 1 and 2 in accordance with an embodiment of the disclosure.

A speed control input, e.g., operator drive control lever 204, may be pivotally mounted to the control handle 202 such that it may pivot about an axis (e.g., a horizontal, transverse axis 205 as shown in FIG. 2) under control of the operator. Pivoting of the drive control lever 204 may affect both speed and direction (e.g., forward or reverse) of the drive wheels 106 via manipulation of the vehicle's drive system (e.g., transmission 124 of FIGS. 4 and 5). For example, as shown in FIG. 3, the control lever 204 may be pivoted incrementally in a forward direction F (which motion proportionally increases the forward propulsion speed of the drive wheels 106) between an intermediate, neutral position (as shown; the neutral position corresponding to zero velocity of the drive wheels) and a full forward position, the latter limited by abutment with a forward lever rest 208 and corresponding to a maximum forward speed. Similarly, the control lever 204 may be pivotable incrementally in a rearward direction R (which motion proportionally increases the rearward propulsion speed of the drive wheels 106) between the neutral position and a full reverse position, the latter limited by abutment with a rear lever rest 210 and corresponding to a maximum reverse speed.

To interact with the vehicle drive system, the control lever 204 may include an arm 207 connected to an end 209 of a push-pull cable 211. Accordingly, pivotal movement of the control lever 204 about the axis 205 (see also FIG. 2) causes the push-pull cable 211 to effectively extend/retract. An opposite end (not shown) of the cable 211 may connect to an input arm (also not shown) of the transmission 124 (see FIGS. 4 and 5), whereby the transmission output may be manipulated by extension/retraction of the cable 211.

The fixed control area 111 (see FIG. 2) may provide controls 113 adapted to manipulate various systems/mechanisms of the vehicle including, for example engine throttle setting and ignition switch, and controls for the material application apparatus (described below). In other embodiments, the control area 111 may also provide various vehicle/system operating indicators such as engine temperature, battery charge level, etc. As with the control handle 202, the controls 113 may be conveniently accessible by the operator while standing upon the platform 112. In still yet other embodiments, any or all of the controls located upon the fixed control area (e.g., controls for the material application apparatus) may be instead mounted on the movable control handle 202.

As stated above, the chassis 102 may also support the material application apparatus as shown in FIGS. 1 and 2. In one embodiment, the material application apparatus includes at least a granular material spreader 114 (see FIG. 1) fed by an onboard hopper 116. The spreader 114/hopper 116 may be located at or near the front end 103 of the chassis 102 as shown in FIG. 1. Alternatively or in addition to the spreader 114, the material application apparatus may also include a liquid sprayer 118 having a reservoir 120, one or more spray nozzles 117, and a spray wand 122. The reservoir 120 may, in one embodiment, be located most anywhere (e.g., mid- or rear-area) on the chassis 102/vehicle 100. By incorporating both the granular spreader 114 and the liquid sprayer 118, the vehicle 100 may be used to distribute a wide variety of products (e.g., fertilizer, pesticide, seed, ice control materials, etc.) to the ground surface 105.

Figure 4:
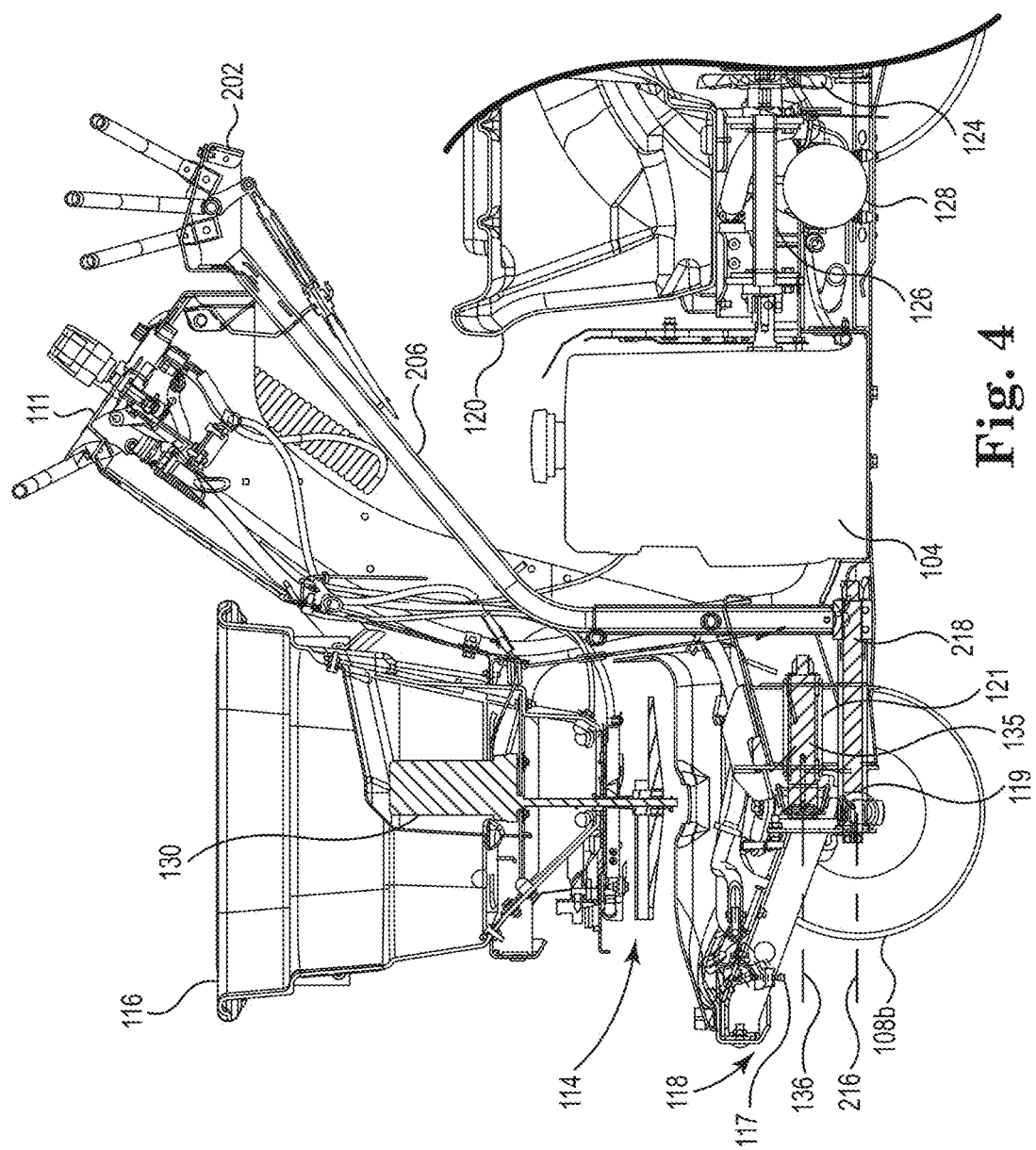
FIG. 4 is a partial side elevation section view of the spreader/sprayer of FIGS. 1 and 2.
Figure 5:
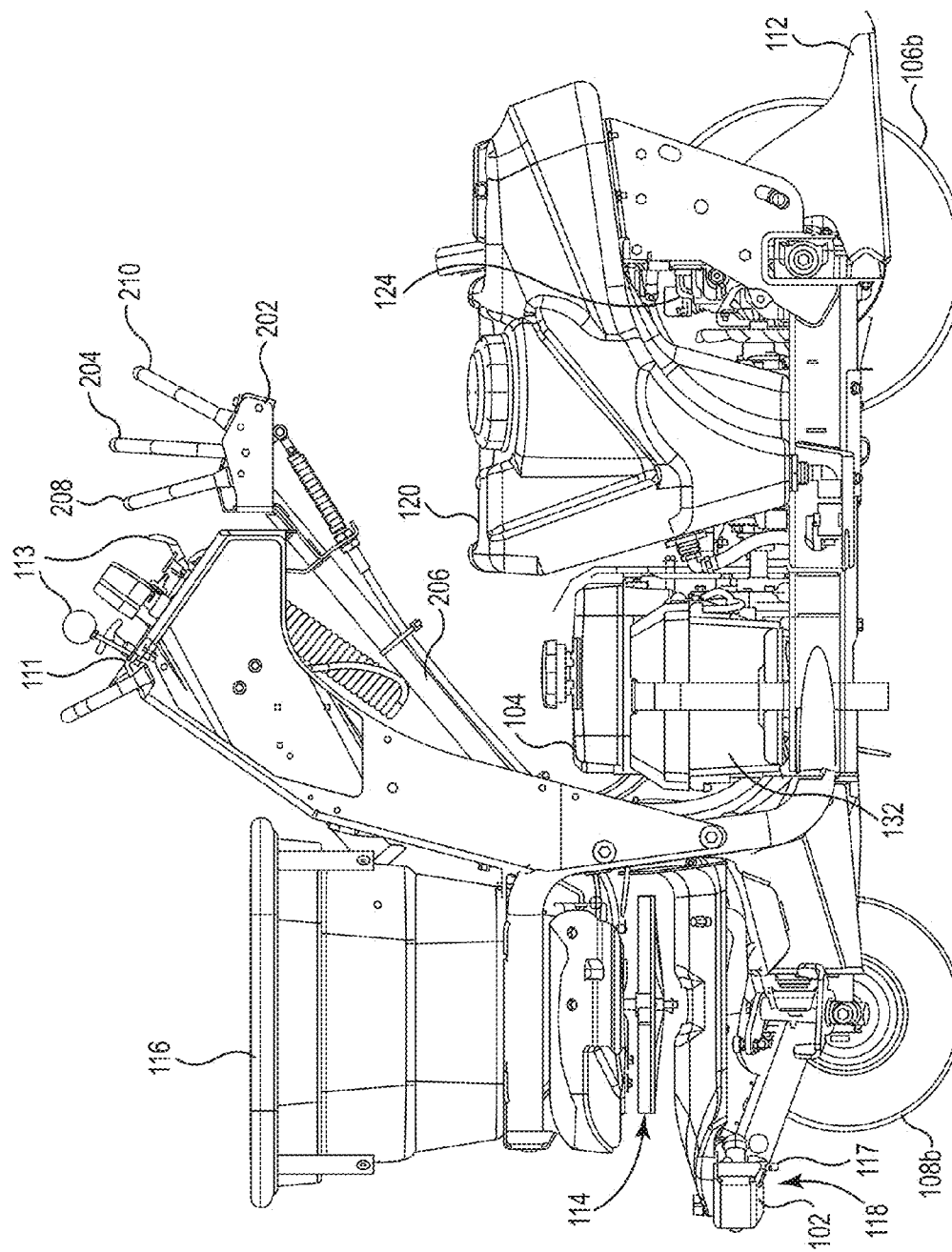
FIG. 5 is a side elevation view of the spreader/sprayer of FIGS. 1 and 2 with some structure (e.g., left side wheels) removed.

FIG. 4 is a sectioned, side elevation view of the vehicle 100, while FIG. 5 is a similar side elevation view with various structure, e.g., wheels 106a and 108a, removed to better illustrate aspects of the exemplary vehicle 100. As shown in these views, the engine 104 may, in one embodiment, be connected to the transmission 124 via a drive shaft 126. The engine 104 may further provide power to a pump 128 of the liquid sprayer 118. The material spreader 114 may be powered by an electric motor 130 (see FIG. 4) operatively connected to the engine, e.g., via an alternator and battery 132 (see FIGS. 1 and 5) or, alternatively, hydraulically or via a direct drive element (e.g., belt) connected to the engine.

The engine 104 may also power the pump 128 (see FIG. 4) such that, when either the spray nozzles 117 or the wand 122 (FIG. 2) is actuated (e.g., the latter by a hand lever located on the wand), liquid may be dispensed from the reservoir 120 under pressure. Once again, the spreader electric motor 130 (see FIG. 4) may also be actuated, e.g., via manipulation of one or more of the controls 113, to outwardly broadcast granular material from the hopper 116. The controls 113 may, in one embodiment, also operate other aspects of the apparatus (e.g., hopper gates, motor/broadcast spinner speed, etc.) that control distribution (i.e., rate, distribution path width and offset, distribution shape, etc.) of the granular material.

During operation of the vehicle 100, power is selectively delivered (by the prime mover 104) to the drive wheels 106, whereby one or both drive wheels may rotate and propel the vehicle over the ground surface 105. The operator may control the vehicle 100 (e.g., access all controls on the control handle 202 and the fixed control area 111) while standing upon the platform 112. A knee brace 115 (see FIG. 2) may be included to provide a comfortable leaning support for the operator's legs during vehicle operation.

With this introduction, a steering system 200 in accordance with one embodiment of this disclosure will now be described, initially with reference to FIGS. 4 and 6. As stated elsewhere herein, the steering system 200 may include the control member 206 to which the operator control handle 202 is attached. When the control handle 202 is displaced, e.g., swung from side-to-side, the front wheels 108 may turn about their respective steer axes, thereby allowing the vehicle to change heading (e.g., execute a turn). For example, when the control handle 202 is swung to the right side (from the operator's perspective), the steering system 200 may execute a right turn proportional to the degree of swing of the control handle. Conversely, if the control handle 202 is swung to the left side, the steering system 200 may execute a left turn (again, the degree of turn being proportional to the degree of swing of the control handle).

The control member 206 may include both a first (e.g., upper) end 213 defining the operator control handle 202, and a second end 214. The second end 214 may be pivotally connected to the chassis 102 (e.g., via a pivot shaft 218) such that the control member 206 is pivotable, relative to the chassis, about a pivot axis 216. In the illustrated embodiment, the pivot axis 216 is parallel to the longitudinal axis 101 (see FIG. 1), but other pivot axis orientations are possible without departing from the scope of this disclosure.

As used herein, "control member" (206) may be used to refer to the upwardly and rearwardly extending control arm portion of the control member alone, or the control arm portion combined with the attached pivot shaft 218. Stated alternatively, the pivot shaft 218 may be integral to, or a component separately attached (e.g., clamped) to, the control member.

The chassis 102 may form a journal 119 (not shown in FIG. 6, but see FIG. 4) to receive the pivot shaft 218 for rotation relative to the chassis 102 about the pivot axis 216. FIG. 6 further illustrates a lever arm 220 connected (e.g., welded or otherwise fixedly attached) to the pivot shaft 218. The lever arm 220 may thus pivot through a travel arc in unison with pivotal movement of the pivot shaft 218. While shown as being attached to a front end of the pivot shaft 218, such relative location of the lever arm 220 is exemplary only. That is, the lever arm 220 may be located at any position along (or relative to) the pivot shaft 218 that permits a swinging or distal end of the lever arm (e.g., the end of the lever arm spaced-apart from the pivot axis 216) to travel through its desired travel arc.

Figure 6:
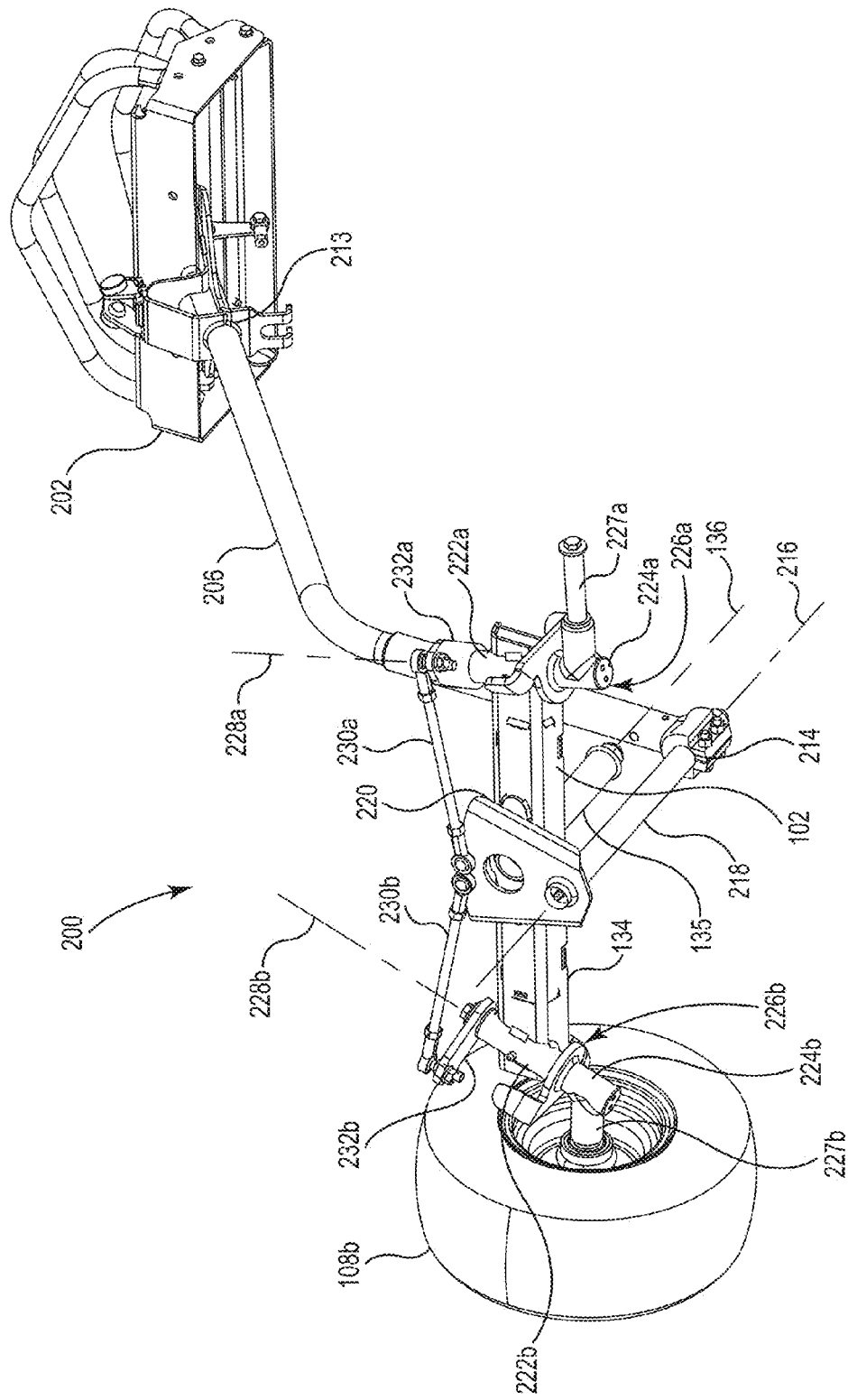
FIG. 6 is a bottom perspective view of the exemplary steering system of the spreader/sprayer of FIGS. 1 and 2, wherein various vehicle structure is removed to more effectively illustrate the steering system.

With reference still to FIGS. 4 and 6, the front wheels 108 may operatively attach to ends of a pivoting transverse beam 134 of the chassis 102. For example, in one embodiment, the transverse beam 134 may be pivotally coupled to a journal 121 of the chassis 102 via a pivot shaft 135 such that the transverse beam (and thus the front wheels 108) may pivot about a longitudinal pivot axis 136, relative to the rest of the chassis 102, during traversal of undulating terrain. While shown as being located centrally on the beam 134, the pivot axis 136 could be offset to one side or the other where such offset may be beneficial.

Each end of the transverse beam 134 may include a spindle housing 222 (222a, 222b) forming a journal for receiving a kingpin or spindle 224 (224a, 224b) of a steering knuckle 226 (226a, 226b). Each steering knuckle 226 may further include a wheel axle 227 (227a, 227b) about which its respective wheel 108 may rotate during vehicle travel. Moreover, each spindle 222 defines a steer axis 228 (228a, 228b) about which its respective steering knuckle 226 (and, accordingly, its respective wheel 108) may pivot, relative to the chassis 102, during vehicle turning. The steer axis 228 may be vertical, or slightly inclined from vertical as shown. In the illustrated embodiment, the pivot axis 216 may be located at an elevation that is below an uppermost surface of each front wheel 108, e.g., the pivot axis is at or near an elevation of the axles 227. However, such a configuration is not limiting as other pivot axis elevations, locations, and orientations are possible without departing from the scope of the disclosure.

A connecting element or rod 230 (e.g., tie rods 230a and 230b) may attach or connect to the distal end of the lever arm 220 and to an outer end of a steering knuckle lever 232 (232a, 232b) of each steering knuckle as illustrated in FIG. 6. The outer end of each steering knuckle lever 232 is spaced-apart from its respective steer axis 228 such that displacement of the lever, via the tie rods 230, results in pivoting of the entire steering knuckle 226. As shown in FIG. 6, each of the tie rods 230 may attach to both the lever arm 220 and their respective steering knuckle lever 232 via a spherical rod end connection to permit out-of-plane motion. Moreover, the tie rods 230 may include adjustment features to allow adjustment of the steering system during manufacture/maintenance.

Figure 7:
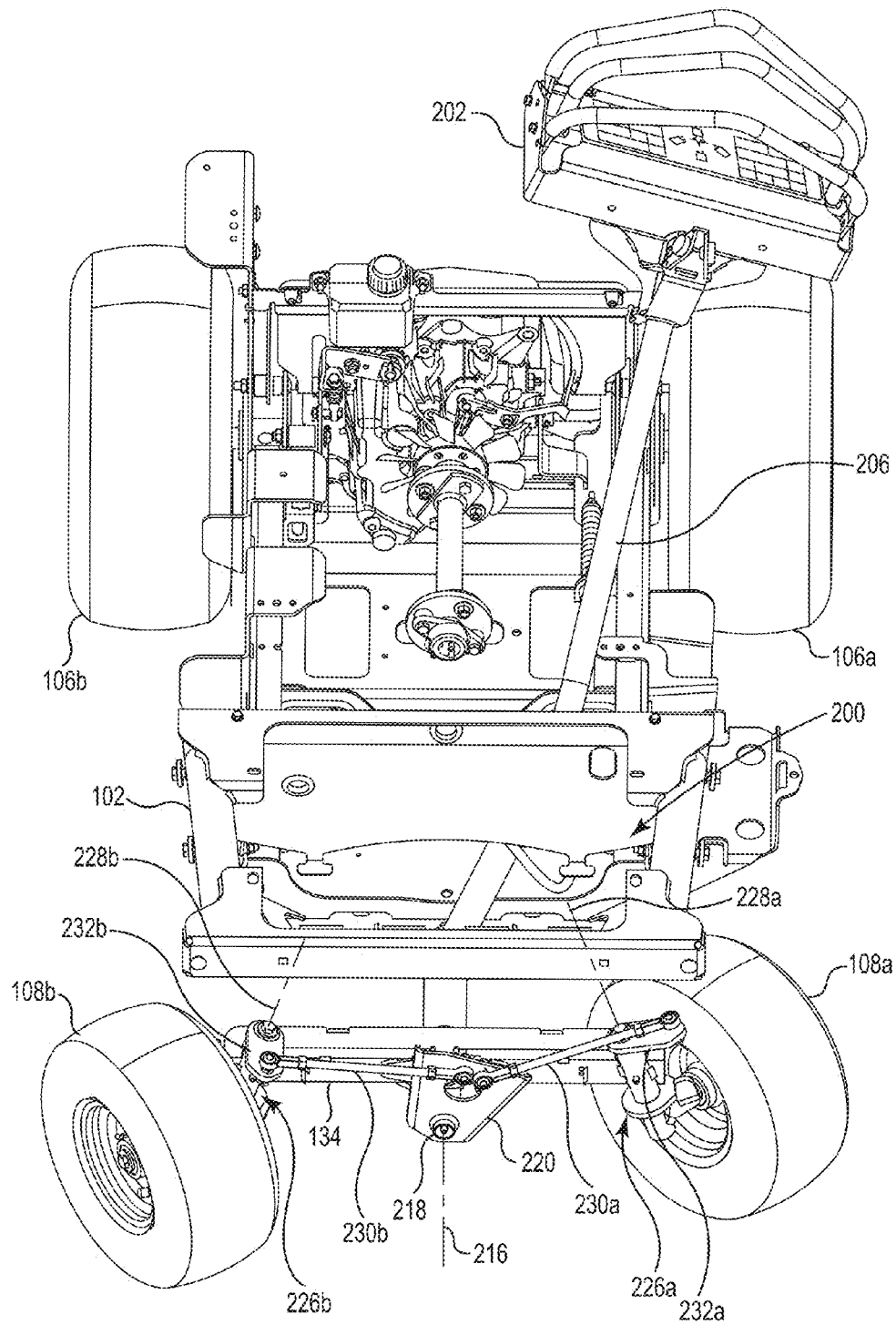
FIG. 7 is an upper front perspective view of the spreader/sprayer of FIGS. 1 and 2 with some vehicle structure removed to illustrate the steering system, the steering system shown executing a sharp left turn.
Figure 8:
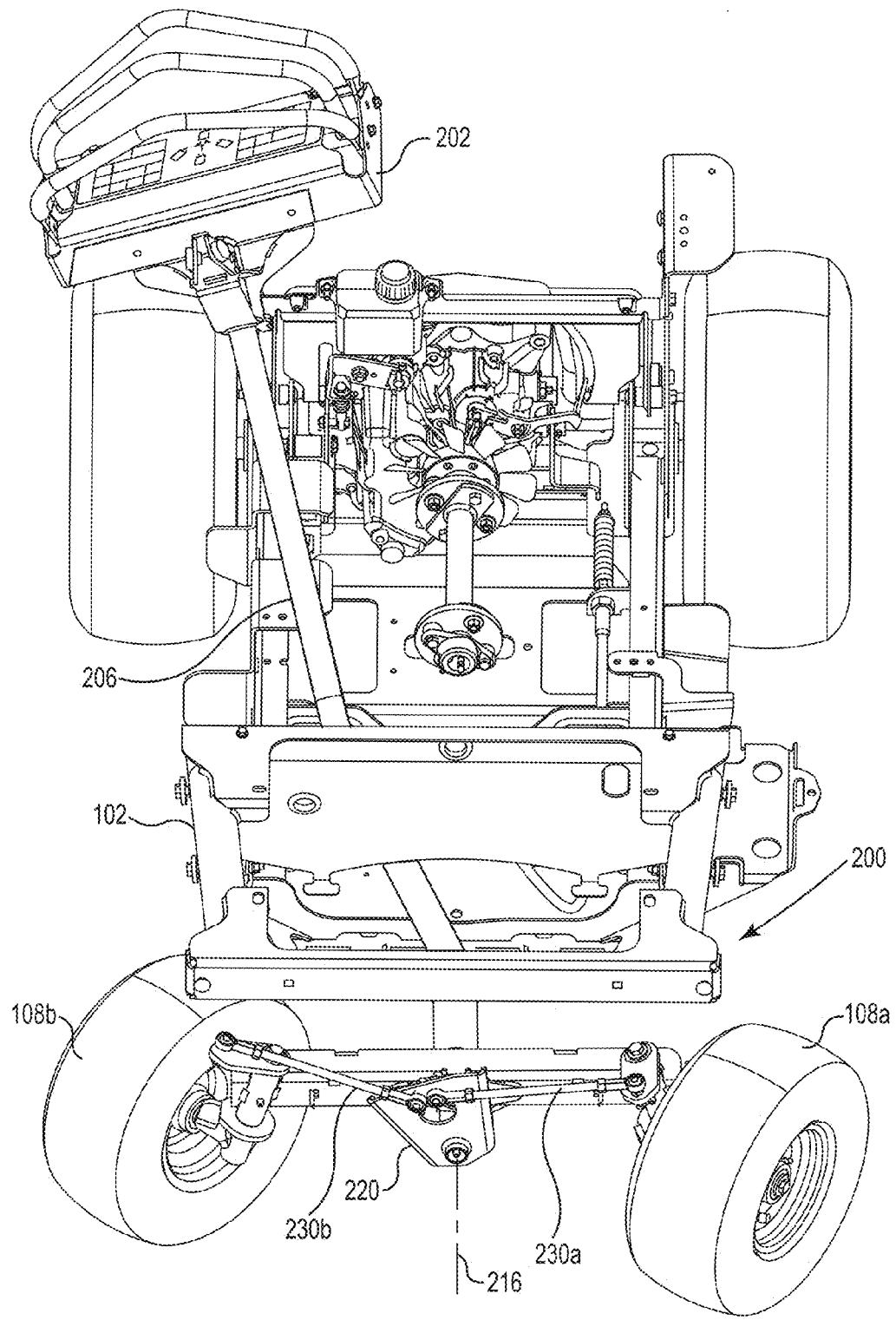
FIG. 8 is an upper front perspective view of the spreader/sprayer of FIGS. 1 and 2 with some vehicle structure removed to illustrate the steering system, the steering system shown executing a sharp right turn.

FIG. 6 illustrates the steering system 200 when the system is positioned for straight-ahead vehicle travel. FIG. 7 is an upper front perspective view of the steering system 200 (with some vehicle structure removed) when the steering system is instead executing a sharp left turn. FIG. 8 is a view similar to FIG. 7, but with the steering system 200 executing a sharp right turn. As indicated in these views, lateral movement/displacement of the control handle 202 (e.g., swinging of the control handle 202/control member 206 about the pivot axis 216) causes the lever arm 220 to correspondingly pivot (either left or right) as shown. As a result, the tie rods 230 are displaced, thus pivoting the steering knuckles 226 and, therefore, the wheels 108 (about their respective steer axes 228) either to the left (FIG. 7) or the right (FIG. 8). As a result, the vehicle may execute a left or right turn in both forward and reverse travel. As is clear from the Figures, movement of the control handle 202 results in intuitive steering response (e.g., left swing results in left steer, and right swing results in right steer).

FIGS. 9A and 9B diagrammatically illustrate other embodiments wherein some of the mechanical structure of the steering system is replaced with an electronic control system. For instance, FIG. 9A illustrates a vehicle 300 that includes a chassis 102, prime mover (not shown), rear drive wheels (also not shown), front wheels 108, and axles 227, among other features, that are configured to operate in a manner similar to the correspondingly numbered elements of the vehicle 100 described above. Moreover, the vehicle 300 may include a swinging control handle 302 and control member 306 (e.g., pivotable about the axis 216) that are also similar to the control handle 202 and control member 206, respectively, described above. However, unlike of the mechanical connection (e.g., pivot shaft 218 directly connected to lever arm 220) of the vehicle 100, the vehicle 300 may instead include a position sensor 317 adapted to detect a swing position of the control handle 302/control member 306 and output a position signal 318 indicative thereof to a microprocessor-based controller 321. Based on the received position signal 318, the controller 321 may calculate a steering angle for each front wheel 108 and output a steering angle command signal 319 to a steering actuator 323 (e.g., hydraulic, pneumatic, or electric rotary or linear displacement device). In the embodiment of FIG. 9A, the actuator 323 may be connected to respective steering knuckles 226 (e.g., to steering knuckle levers (see FIG. 6) as already described herein) via tie rods 325a, 325b. As a result, the actuator 323 (e.g., rotary motor) may turn the respective wheels 108a, 108b (e.g., about their respective steer axes 228) to the desired steering angle. The system may also include a feedback sensor 329 that provides the current steering motor position to the controller 321.

While shown in FIG. 9A as using a single actuator 323 and tie rods 325 connecting the actuator to each wheel 108, the embodiment of FIG. 9B may instead utilize an independent actuator (323a, 323b) having an output shaft coupled (e.g., directly coupled) to the spindle of each front wheel (108a, 108b). As a result, the controller 321 may issue independent steering angle command signals 319a, 319b to each actuator 323a, 323b corresponding to the intended heading as measured by the position sensor 317. Each actuator 323a, 323b may include its own feedback sensor 329a, 329b (respectively) to provide the controller 321 with its respective steering position.

Accordingly, steering systems in accordance with embodiments of the present disclosure may permit an operator to control the vehicle, including speed (in both forward and reverse) and heading (steer direction), using one hand. As a result, the other hand is free to manipulate or interact with other vehicle controls (see, e.g., controls 113 of fixed control area 111 in FIG. 2).

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A utility vehicle comprising:
   a chassis comprising a front end and a rear end;
   at least one front wheel rotatably coupled to the front end of the chassis, wherein the front wheel is adapted to rotate about an axle attached to a steering knuckle, the steering knuckle adapted to pivot, relative to the chassis, about a steer axis;
   a steering system comprising:
      a control member comprising a first end defining an operator control handle, and a second end pivotally connected to the chassis such that the control member is pivotable, relative to the chassis, about a pivot axis;
      a lever arm connected to the control member at or near the second end, the lever arm comprising a distal end spaced-apart from the pivot axis; and
      a connecting element attached to the distal end of the lever arm and to the steering knuckle;
      wherein the steering system proportionally converts lateral movement of the control handle to pivoting of the front wheel about the steer axis.

2. The vehicle of claim 1, wherein the control member comprises a pivot shaft and a control arm, the pivot shaft forming the second end of the control member.

3. The vehicle of claim 2, wherein at least a portion of the control arm extends upwardly and rearwardly from the pivot shaft.

4. The vehicle of claim 1, wherein the chassis further defines a longitudinal axis extending between the front and rear ends of the chassis, wherein the pivot axis is parallel to the longitudinal axis.

5. The vehicle of claim 1, further comprising a material application apparatus attached to the chassis.

6. The vehicle of claim 5, wherein the material application apparatus comprises one or both of a granular material spreader and a liquid sprayer.

7. The vehicle of claim 1, further comprising at least one rear wheel rotatably coupled to the chassis and powered by a prime mover supported by the chassis.

8. The vehicle of claim 1, wherein the operator control handle comprises a speed control input.

9. The vehicle of claim 1, wherein the pivot axis is located at an elevation at or near an elevation of the axle.

10. The vehicle of claim 1, further comprising an operator support platform attached to the chassis.

11. A utility vehicle comprising:
    a chassis comprising a front end, a rear end, and a longitudinal axis extending between the front and rear ends;

at least one front wheel rotatably coupled to the front end of the chassis, wherein the front wheel is adapted to rotate about an axle attached to a steering knuckle, the steering knuckle adapted to pivot, relative to the chassis, about a steer axis;

a steering system comprising:
  a pivot shaft pivotally coupled to the chassis such that the pivot shaft pivots about a pivot axis that is parallel to the longitudinal axis;
  a control arm comprising a first end defining an operator control handle, and a second end connected to the pivot shaft;
  a lever arm also connected to the pivot shaft, the lever arm comprising a distal end spaced-apart from the pivot axis; and
  a connecting rod attached to the distal end of the lever arm and to the steering knuckle;
  wherein the steering system proportionally converts lateral movement of the control handle to pivoting of the front wheel about the steer axis.

12. The vehicle of claim 11, wherein the control handle comprises operator controls adapted to selectively change a rotational speed and direction of a powered rear wheel.

13. The vehicle of claim 11, wherein the pivot axis is located at an elevation at or near an elevation of the axle of the front wheel.

14. The vehicle of claim 11, further comprising a material application apparatus supported by the chassis.

15. The vehicle of claim 14, wherein the material application apparatus comprises one or both of a granular material spreader and a liquid sprayer.

16. The vehicle of claim 11, further comprising an operator platform attached to the chassis and adapted to support a riding operator.

17. A utility vehicle comprising:
a chassis comprising a front end and a rear end, wherein a longitudinal axis extends along the chassis between the front and rear ends;
a prime mover supported by the chassis;
at least one rear wheel rotatably coupled to the chassis at or near the rear end, wherein the rear wheel is powered by the prime mover to propel the vehicle over a ground surface;
left and right front wheels rotatably coupled to the chassis at or near the front end, wherein: the left front wheel is adapted to rotate about a left axle, the left axle attached to a left steering knuckle that is itself coupled to the chassis at, and pivotable about, a left wheel steer axis; and the right front wheel is adapted to rotate about a right axle, the right axle attached to a right steering knuckle that is itself coupled to the chassis at, and pivotable about, a right wheel steer axis;
a platform attached to the chassis and adapted to support an operator; and
a steering system comprising:
  a pivot shaft attached to the chassis and operable to pivot about a pivot axis parallel to the longitudinal axis;
  a control arm comprising a second end attached to the pivot shaft, the control arm extending upwardly and rearwardly to terminate at a first end;
  a lever arm attached to the pivot shaft;
  a left tie rod connected between the lever arm and the left steering knuckle, and a right tie rod connected between the lever arm and the right steering knuckle; and
  a control handle attached to the first end of the control arm, wherein lateral movement of the control handle results in proportional pivoting of the left and right front wheels about the left and right steer axes, respectively.

18. The vehicle of claim 17, wherein the pivot axis is located at an elevation at or near an elevation of one or both of the left and right axles.

19. The vehicle of claim 17, further comprising a second rear wheel rotatably coupled to the chassis at or near the rear end and transversely spaced-apart from the at least one rear wheel, wherein the second rear wheel is also powered by the prime mover.

20. The vehicle of claim 17, wherein the platform is located at or near the rear end of the chassis.

21. A utility vehicle comprising:
a chassis comprising a front end and a rear end;
a front wheel rotatably coupled to the front end of the chassis, wherein the front wheel is adapted to rotate about an axle attached to a steering knuckle, the steering knuckle adapted to pivot, relative to the chassis, about a steer axis;
a steering system comprising:
  a control member comprising a first end defining an operator control handle, and a second end pivotally connected to the chassis such that the control member is pivotable, relative to the chassis, about a pivot axis;
  a position sensor adapted to detect a position of the control member and produce a position signal;
  an electronic controller adapted to receive the position signal and calculate a steering angle command signal; and
  an actuator operatively connected to the steering knuckle, wherein the actuator is adapted to receive the steering angle command signal and pivot the front wheel about the steer axis in response to the steering angle command signal.

22. The vehicle of claim 21, further comprising an operator platform attached to the chassis and operable to support a ride-on operator.

23. The vehicle of claim 21, further comprising a second front wheel adapted to rotate about a second axle attached to a second steering knuckle, the second steering knuckle adapted to pivot, relative to the chassis, about a second steer axis.

24. The vehicle of claim 21, wherein the actuator is connected to the steering knuckle by a tie rod.

25. The vehicle of claim 21, wherein the actuator comprises a rotary motor having an output shaft coupled to a spindle of the front wheel.

* * * * *